United States Patent
Danihelka et al.

(10) Patent No.: US 11,010,663 B2
(45) Date of Patent: May 18, 2021

(54) ASSOCIATIVE LONG SHORT-TERM MEMORY NEURAL NETWORK LAYERS

(71) Applicant: DeepMind Technologies Limited, London (GB)

(72) Inventors: Ivo Danihelka, London (GB); Nal Emmerich Kalchbrenner, London (GB); Gregory Duncan Wayne, London (GB); Benigno Uría-Martínez, London (GB); Alexander Benjamin Graves, London (GB)

(73) Assignee: DeepMind Technologies Limited, London (GB)

( * ) Notice: Subject to any disclaimer, the term of this patent is extended or adjusted under 35 U.S.C. 154(b) by 893 days.

(21) Appl. No.: 15/395,553

(22) Filed: Dec. 30, 2016

(65) Prior Publication Data
US 2017/0228642 A1 Aug. 10, 2017

Related U.S. Application Data

(60) Provisional application No. 62/291,467, filed on Feb. 4, 2016.

(51) Int. Cl.
*G06N 3/08* (2006.01)
*G06N 3/04* (2006.01)

(52) U.S. Cl.
CPC .......... *G06N 3/08* (2013.01); *G06N 3/04* (2013.01); *G06N 3/0445* (2013.01)

(58) Field of Classification Search
CPC .......... G06N 3/08; G06N 3/04; G06N 3/0445; G06N 3/063; G06N 3/082; G06N 20/00
USPC .......................................................... 706/25
See application file for complete search history.

(56) References Cited

U.S. PATENT DOCUMENTS 9,652,712 B2 * 5/2017 Corrado .................. G06N 3/04

OTHER PUBLICATIONS

Graves et al., "Speech Recognition With Deep Recurrent Neural Networks," pp. 6645-6649 (2013 IEEE International Conference on Acoustics, Speech and Signal Processing, May 2013) (Year: 2013).*
Ralf C. Staudemeyer—"Applying long short-term memory recurrent neural networks to intrusion detection"—2015—https://pdfs.semanticscholar.org/f34c/bcb44e3b4523b9034de0630a458787759b4d.pdf (Year: 2015).*
Colah—"Understanding LSTM Networks"—2015—https://web.archive.org/web/20160203205930/https://colah.github.io/posts/2015-08-Understanding-LSTMs/ (Year: 2015).*

(Continued)

*Primary Examiner* — Viker A Lamardo
(74) *Attorney, Agent, or Firm* — Fish & Richardson P.C.

(57) ABSTRACT

Systems, methods, and apparatus, including computer programs encoded on a computer storage medium, related to associative long short-term memory (LSTM) neural network layers configured to maintain N copies of an internal state for the associative LSTM layer, N being an integer greater than one. In one aspect, a system includes a recurrent neural network including an associative LSTM layer, wherein the associative LSTM layer is configured to, for each time step, receive a layer input, update each of the N copies of the internal state using the layer input for the time step and a layer output generated by the associative LSTM layer for a preceding time step, and generate a layer output for the time step using the N updated copies of the internal state.

20 Claims, 4 Drawing Sheets

(56) References Cited

OTHER PUBLICATIONS

Ordóñez et al.—"Deep Convolutional and LSTM Recurrent Neural Networks for Multimodal Wearable Activity Recognition"—Jan. 18, 2016—https://www.mdpi.com/1424-8220/16/1/115 (Year: 2016).*
Graves et al.—"Speech Recognition With Deep Recurrent Neural Networks"—2013—https://arxiv.org/pdf/1303.5778.pdf (Year: 2013).*
Tay et al.—"Learning to Attend via Word-Aspect Associative Fusion for Aspect-based Sentiment Analysis"—2017—https://arxiv.org/pdf/1712.05403.pdf (Year: 2017).*
Tay et al.—"Learning to Rank Question Answer Pairs with Holographic Dual LSTM Architecture"—2017—https://arxiv.org/pdf/1707.06372.pdf (Year: 2017).*
Nickel et al.—"Holographic Embeddings of Knowledge Graphs"—2015—https://arxiv.org/pdf/1510.04935.pdf (Year: 2015).*
Plate et al.—"Holographic Reduced Representations: Convolution Algebra for Compositional Distributed Representations"—1991—https://www.semanticscholar.org/paper/Holographic-Reduced-Representations%3A-Convolution-Plate/a7a9eeb64ec4511ed1415baa4716da15e2897641 (Year: 1991).*
Plante et al.—"Holographic reduced representations"—1995—https://ieeexplore.ieee.org/document/377968 (Year: 1995).*
Plate et al.—"Holographic recurrent networks"—1992—https://dl.acm.org/doi/10.5555/2987061.2987066 (Year: 1992).*
Danihelka et al.—"Associative Long Short-Term Memory"—2016—https://arxiv.org/abs/1602.03032 (Year: 2016).*
Graves et al.—"Neural Turing Machines"—2014—https://arxiv.org/abs/1410.5401 (Year: 2014).*
Danihelka et al. "Associative Long Short-Term Memory," arXiv preprint arXiv:1602.03032 Version 1, Feb. 9, 2016, 9 pages.
Danihelka et al. "Associative Long Short-Term Memory," arXiv preprint arXiv:1602.03032v2 Version 2, May 19, 2016, 10 pages.
International Search Report and Written Opinion in International Application No. PCT/US2016/069505, dated Mar. 27, 2017, 14 pages.
Graves et al. "Speech recognition with deep recurrent neural networks," 2013 IEEE International Conference on Acoustics, Speech and Signal Processing; Vancouver, BC, May 26-31, 2013, Institute of Electrical and Electronics Engineers, Piscataway, NJ, May 26, 2013, 5 pages.
Arjovsky et al. "Unitary evolution recurrent neural networks," arXiv preprint arXiv1511.06464, Nov. 20, 2015, 11 pages.
Gers et al. "Learning to forget: Continual prediction with lstm," Neural Computation, 12(10), Oct. 2000, 19 pages.
Graves. "Generating sequences with recurrent neural networks," arXiv preprint arXiv 1308.0850, Aug. 4, 2013, 43 pages.
Graves et al. "Neural turing machines," arXiv preprint arXiv 1410.5401, Oct. 20, 2014, 26 pages.
Grefenstette et al. "Learning to transduce with unbounded memory," arXiv preprint arXiv1506.02516, Nov. 3, 2015, 14 pages.
Hochreiter et al. "Long Short-term memory," Neural computation, 9(8), Nov. 15, 1997, 46 pages.
'prize.hutter1.net' [online] "The human knowledge compression contest," Jul. 2006 [retrieved on May 30, 2017] Retrieved from Internet: URL<http://prize.hutter1.net> 3 pages.
Joulin et al. "Inferring algorithmic patterns with stack-augmented recurrent nets," Advances in Neural Information Processing Systems 28, 2015, 9 pages.
Jozefowicz et al. "An empirical exploration of recurrent network architectures," Proceedings of the $32^{nd}$ International Conference on Machine Learning, 2015, 9 pages.
Kanerva. "Hyperdimensional computing: an introduction to computing gin distributed representation with high-dimensional random vectors," Cognitive Computation, 1(2), 2009, 21 pages.
Kingma et al. "Adam: A method for stochastic optimization," arXiv preprint arXiv 1412.6980, Dec. 22, 2014, 9 pages.
Russakovsky et al. "ImageNet Large Scale Visual Recognition Challenge," arXiv preprint arXiv1409.0575v3 Jan. 30, 2015, 43 pages.
Sukhbaatar et al. "End-to-end memory networks, Advances in Neural Information Processing Systems," 2015, 9 pages.
Sutskever et al. "Generating text with recurrent neural networks," Proceedings of the $28^{th}$ International Conference on Machine Learning, 2011, 8 pages.
Sutskever et al. "Sequence to sequence learning with neural networks," Advances in Neural Information Processing Systems, 2014, 9 pages.
Williams et al. "An efficient gradient-based algorithm for on-line training of recurrent network trajectories," Neural computation, 2(4) 1990, 12 pages.
Zaremba et al. "Reinforcement learning neural turing machines," arXiv preprint arXiv1505.00521, May 4, 2015, 13 pages.
EP Communication pursuant to Article 94(3) EPC in European Appln. No. 16829474.2, dated Apr. 8, 2020, 7 pages.

* cited by examiner

ASSOCIATIVE LONG SHORT-TERM MEMORY NEURAL NETWORK LAYERS

CROSS REFERENCE TO RELATED APPLICATIONS

This application is a non-provisional of and claims priority to U.S. Provisional Patent Application No. 62/291,467, filed on Feb. 4, 2016, the entire contents of which are hereby incorporated by reference.

BACKGROUND

This specification relates to recurrent neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters. Some reinforcement learning systems select the action to be performed by the agent in response to receiving a given observation in accordance with an output of a neural network.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

In general, one innovative aspect of the subject matter described in this specification can be embodied in systems that include a recurrent neural network implemented by one or more computers, wherein the recurrent neural network is configured to receive a respective neural network input at each of a plurality of time steps and to generate a respective neural network output at each of the plurality of time steps, wherein the recurrent neural network includes an associative long short-term memory (LSTM) layer, wherein the associative LSTM layer is configured to maintain N copies of an internal state for the associative LSTM layer, N being an integer greater than one, and wherein the associative LSTM layer is further configured to, at each of the plurality of time steps, receive a layer input for the time step, update each of the N copies of the internal state using the layer input for the time step and a layer output generated by the associative LSTM layer for a preceding time step, and generate a layer output for the time step using the N updated copies of the internal state.

Other embodiments of this aspect include methods that perform the operations that associative LSTM layer is configured to perform. Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Implementations can include one or more of the following optional features. Updating each of the N copies of the internal state includes determining a cell state update for the time step from the layer input at the time step and optionally the layer output for the preceding time step; determining, for each of the N copies of the internal state, a corresponding transformed input key from the layer input at the time step and the layer output for the preceding time step; and for each of the N copies of the internal state, determining the updated copy of the internal state from the copy of the internal state, the cell state update, and the corresponding transformed input key.

Determining, for each of the N copies of the internal state, a corresponding transformed input key from the layer input at the time step and the layer output for the preceding time step includes determining an input key from the layer input at the time step and the layer output for the preceding time step; and for each of the N copies of the internal state, determining the corresponding transformed input key for the copy by permuting the input key with a respective permutation matrix that is specific to the copy.

Updating each of the N copies of the internal state further includes determining an input gate from the layer input at the time step and the layer output for the preceding time step, and determining a forget gate from the layer input at the time step and the layer output for the preceding time step.

Determining the updated copy of the internal state from the copy of the internal state, the cell state update, and the corresponding transformed input key includes applying the forget gate to the copy of the internal state to generate an initial updated copy; applying the input gate to the cell state update to generate a final cell state update; applying the corresponding transformed input key to the final cell state update to generate a rotated cell state update; and combining the initial updated copy and the rotated cell state update to generate the updated copy of the internal state.

Generating the layer output for the time step includes determining, for each of the N copies of the internal state, a corresponding transformed output key from the layer input at the time step and the layer output for the preceding time step; modifying, for each of the N copies of the internal state, the updated copy of the internal state using the corresponding transformed output key; combining the N modified copies to generate a combined internal state for the time step; and determining the layer output from the combined internal state for the time step.

Combining the N modified copies includes determining the average of the N modified copies.

Determining, for each of the N copies of the internal state, a corresponding transformed output key from the layer input at the time step and the layer output for the preceding time step includes determining an output key from the layer input at the time step and the layer output for the preceding time step; and for each of the N copies of the internal state, determining the corresponding transformed output key for the copy by permuting the output key with a respective permutation matrix that is specific to the copy.

Generating the layer output for the time step further includes determining an output gate from the layer input at the time step and the layer output for the preceding time step, and wherein determining the layer output from the combined internal state for the time step includes applying an activation function to the combined internal state to determine an initial layer output; and applying the output gate to the initial layer output to determine the layer output for the time step.

The subject matter described in this specification can be implemented in particular embodiments so as to realize one or more of the following advantages. Recurrent neural network layers with long short-term memory (LSTM) architectures can be implemented with additional memory units to store internal state values and with capabilities to index the internal state memory. Internal state values maintained by LSTM layers will be less noisy and more reliable. Accuracy of LSTM computations that involve tracking multiple elements in input data will be enhanced. By storing multiple copies of the internal state for a time step, LSTM layers become more resilient in the face of internal failures or loss of internal state data. The time complexity of LSTM layers can be reduced to a linear order of growth dependent on the number of stored internal state copies. Collisions between the storage of two or more internal state copies can be mitigated by using internal state copies that were not involved in the collision or for whom the collision has been resolved. By storing more internal state data, LSTM layers can better detect long-term dependencies between their input and output data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
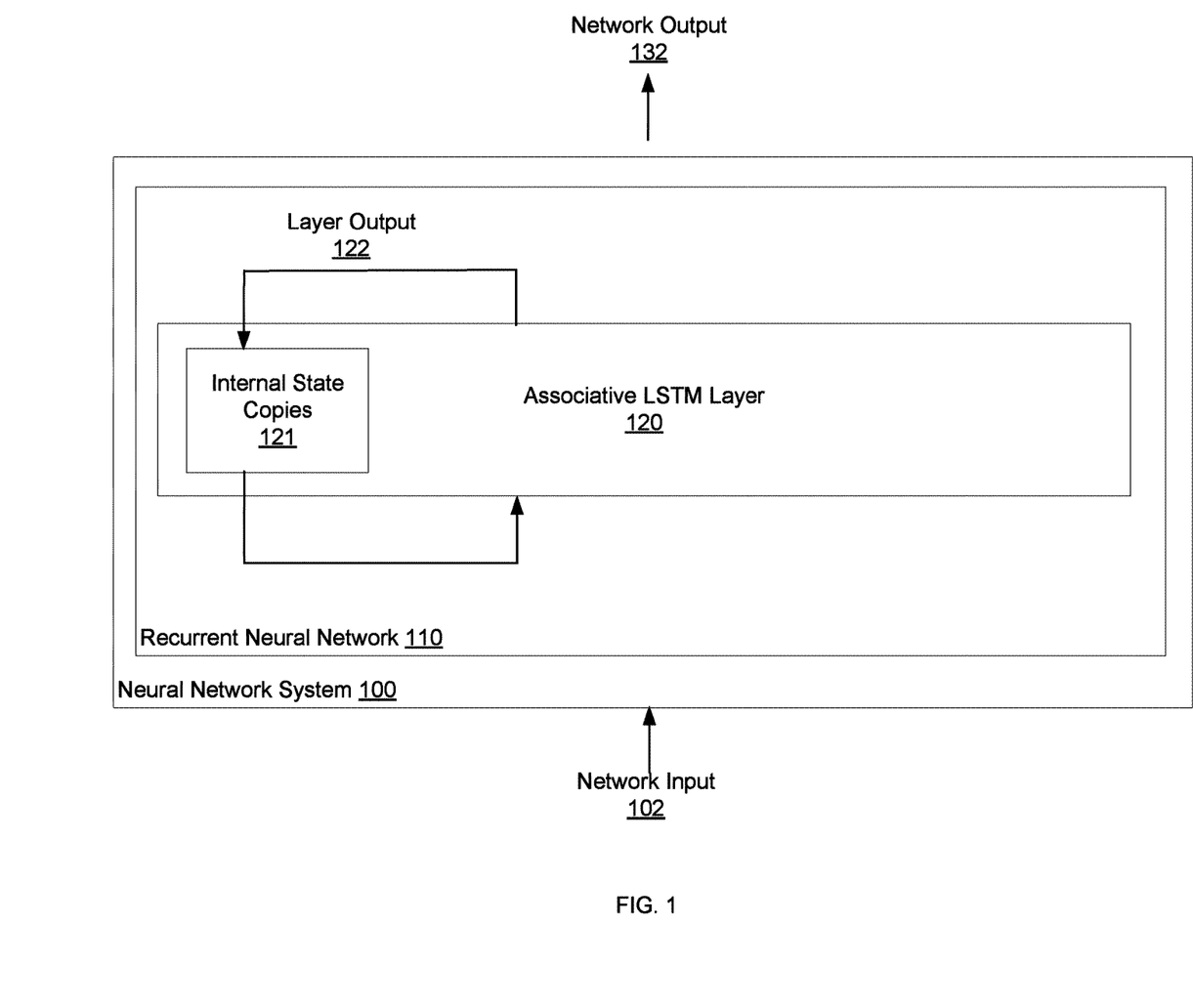
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 is a machine learning system that receives a respective neural network input at each of multiple time steps and generates a respective neural network output at each of the time steps. That is, at each of the multiple time steps, the neural network system 100 receives a neural network input and processes the neural network input to generate a neural network output. For example, at a given time step, the neural network system 100 can receive a neural network input 102 and generate a network output 132.

The neural network system 100 can store the generated neural network outputs in an output data repository or provide the neural network outputs for use for some other immediate purpose.

The neural network system 100 can be configured to receive any kind of digital data input and to generate any kind of score or classification output based on the input.

For example, if the inputs to the neural network system 100 are images or features that have been extracted from images, the output generated by the neural network system 100 for a given image may be scores for each of a set of object categories, with each score representing an estimated likelihood that the image contains an image of an object belonging to the category.

As another example, if the inputs to the neural network system 100 are Internet resources (e.g., web pages), documents, or portions of documents or features extracted from Internet resources, documents, or portions of documents, the output generated by the neural network system 100 for a given Internet resource, document, or portion of a document may be a score for each of a set of topics, with each score representing an estimated likelihood that the Internet resource, document, or document portion is about the topic.

As another example, if the inputs to the neural network system 100 are features of a personalized recommendation for a user, e.g., features characterizing the context for the recommendation, e.g., features characterizing previous actions taken by the user, the output generated by the neural network system 100 may be a score for each of a set of content items, with each score representing an estimated likelihood that the user will respond favorably to being recommended the content item. In some of these examples, the neural network system 100 is part of a reinforcement learning system that provides content recommendations to users.

As another example, if the input to the neural network system 100 is text in one language, the output generated by the neural network system 100 may be a score for each of a set of pieces of text in another language, with each score representing an estimated likelihood that the piece of text in the other language is a proper translation of the input text into the other language.

As another example, if the input to the neural network system 100 is features of a spoken utterance, the output generated by the neural network system 100 may be a score for each of a set of pieces of text, each score representing an estimated likelihood that the piece of text is the correct transcription for the utterance.

As another example if the inputs to the neural network system 100 are images, the output generated by the neural network system 100 may be a score for each of a set of pieces of text, each score representing an estimated likelihood that the piece of text is text that is present in the input image.

In particular, the neural network system 100 includes a recurrent neural network 110 which, in turn, includes an associative long short-term memory (LSTM) layer 120.

The recurrent neural network 110 is configured to, at each of the time steps, receive the neural network input and to process the neural network input to generate the neural network output at the time step.

The recurrent neural network 110 may include one or more neural network layers in addition to the associative LSTM layer 120. For instance, the recurrent neural network 110 can include one or more conventional LSTM layers, one or more other associative LSTM layers, one or more conventional recurrent neural network layers, and/or one or more feedforward neural network layers. In some implementations, the recurrent neural network 110 is a deep LSTM neural network, where the input to the associative LSTM layer 120 is either the input to the recurrent neural network 110 or the output of another LSTM layer of the recurrent neural network 110.

The associative LSTM layer 120 is configured to, at each of the time steps, receive a current layer input 102 and to process the current layer input 102 and an internal state to generate an updated internal state. The associative LSTM layer 120 generates the updated internal state by updating the internal state in accordance with the layer input 102.

The associative LSTM layer 120 can generate an update to the current internal state based on the values of a number of LSTM gates associated with the layer 120. In some implementations, the LSTM gates include an input gate, a forget gate, and an output gate.

The associative LSTM layer 120 can use the value of the LSTM gates to determine a hidden state for a time step. The associative LSTM layer 120 maintains more than one copy of the internal state. At each time step, the associative LSTM layer 120 updates each of the copies 121 of the internal state using the layer input 102 for the time step and the updated internal state generated by the associative LSTM layer for a preceding time step. Updating the copies 121 of the internal state is described in greater detail below with reference to FIG. 3.

The associative LSTM layer 120 also generates for each time step, a layer output 122 for the time step using the updated copies 121 of the internal state. Generating the layer output for the time step using the updated copies 121 of the internal state is described in greater detail below with reference to FIG. 2.

In some implementations, by maintaining more than one copy 121 of the internal state for each time step, the neural network system 100 can reduce the amount of noise associated with values of the internal state used for the associative LSTM layer 120 computations. Each copy 121 of the internal state is a different representation of the internal state. To reduce the amount of noise associated with a retrieved value of the internal state, the neural network system 100 can use a measure of central tendency (e.g., an average) of the representations of the internal state stored in the multiple copies 121 to determine the hidden state of the associative LSTM layer 120 for each time step.

Individual copies 121 of the internal state of the associative LSTM layer 120 may include noise. This may for instance be the case when the internal state tracks the occurrence of multiple elements in a sequence of layer input 102 values. In such circumstances, a measure of the internal state derived from multiple copies of the internal state can correct some of the noise and thus be more reliable and accurate.

For instance, if the internal state for a time step aggregates multiple constituent values where each constituent value estimates an occurrence of one class of filters in a sequence of layer input 102 values for a particular time step, the neural network system 100 can reduce the noise associated with representation of each constituent value in the aggregated internal state by maintaining more than one copy of the internal state and using a measure of the central tendency of the multiple copies of internal state to compute the measure of internal state used for associative LSTM layer 120 computations.

Figure 2:
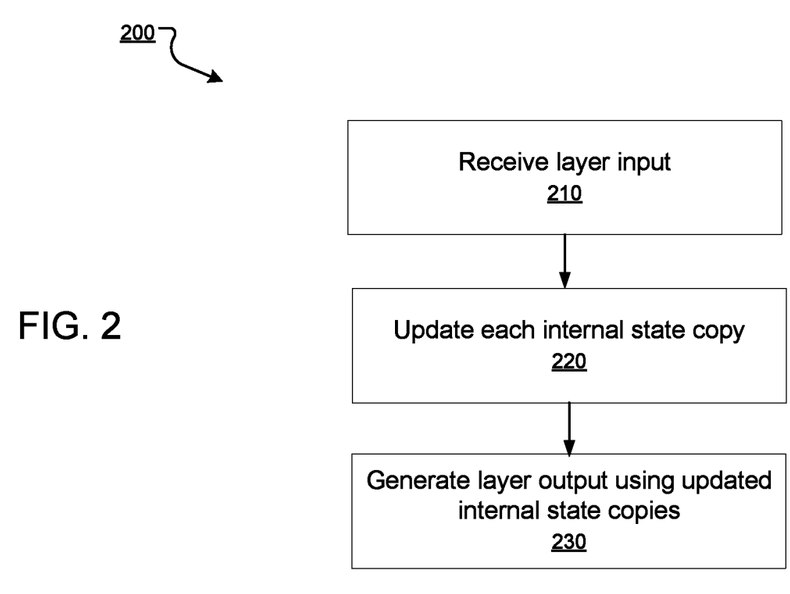
FIG. 2 is a flow chart of an example process for generating a layer output for a time step.

FIG. 2 is a flow chart of an example process 200 for generating a layer output for a time step. For convenience, the process 200 will be described as being performed by an associative LSTM layer implemented by a system of one or more computers located in one or more locations. For example, an associative LSTM layer in a neural network system, e.g., the associative LSTM layer 120 of neural network system 100 of FIG. 1, appropriately programmed in accordance with this specification, can perform the process 200.

The associative LSTM layer receives a layer input for the time step (210).

The associative LSTM layer updates each of the N copies of the internal state using the layer input for the time step and a layer output generated by the associative LSTM layer for a preceding time step (220). Updating each of the N copies of the internal state is described in greater detail below with reference to FIG. 4.

The associative LSTM layer generates a layer output for the time step using the N updated copies of the internal state (230). Generating a layer output for the time step using the updated internal state copies is described in greater detail below with reference to FIG. 3.

Figure 3:
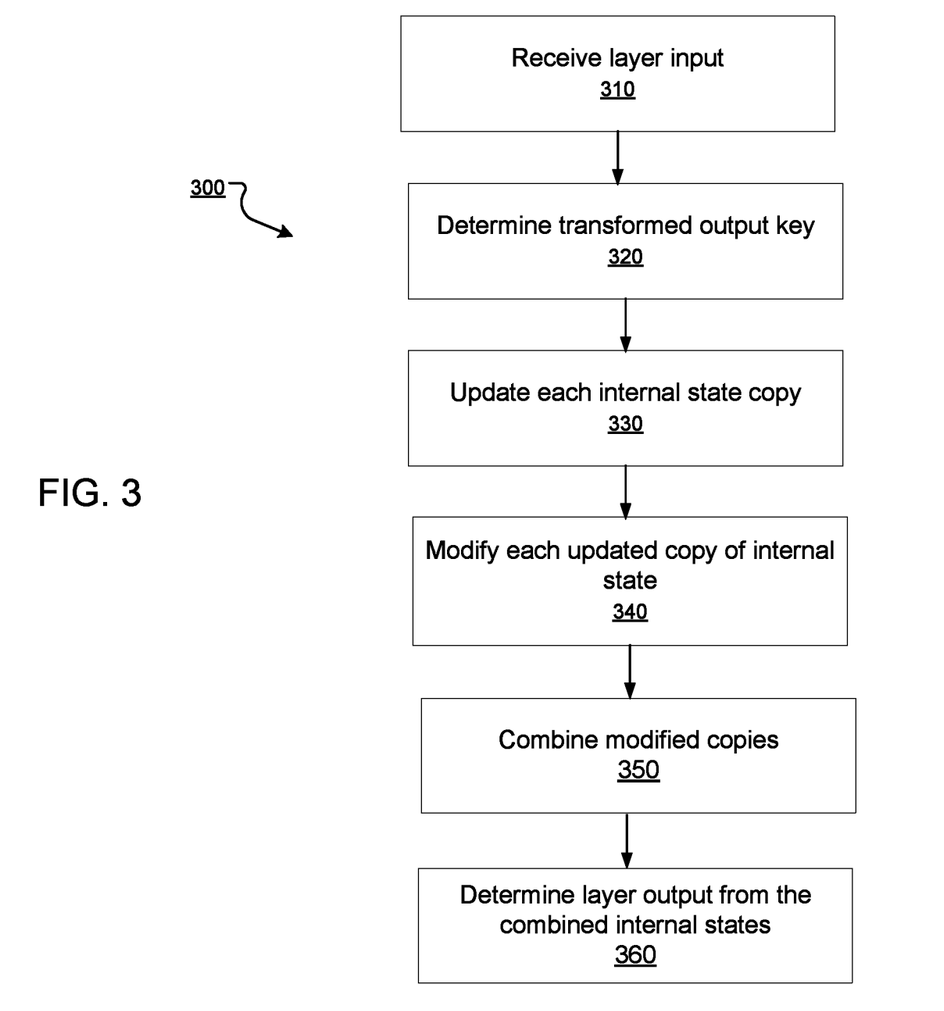
FIG. 3 is a flow chart of an example process for generating a layer output using updated copies of an internal state.

FIG. 3 is a flow chart of an example process 300 for generating a layer output using updated copies of an internal state. For convenience, the process 300 will be described as being performed by an associative LSTM layer implemented by a system of one or more computers located in one or more locations. For example, an associative LSTM layer in a neural network system, e.g., the associative LSTM layer 120 of neural network system 100 of FIG. 1, appropriately programmed in accordance with this specification, can perform the process 300.

The associative LSTM layer receives a layer input (310).

The associative LSTM layer determines a respective transformed output key for each internal state copy from the layer input at the time step and the layer output for the preceding time step (320).

That is, the associative LSTM layer maintains multiple copies of the internal state from time step to time step. When a layer output is received for a given time step, the associative LSTM layer determines a transformed output key for each of the copies from the layer input at the time step and the layer output at the preceding time step.

For each internal state copy, the transformed output key is configured to be used for retrieving an internal state of a time step from a data structure with a distributed representation that represents all of the internal state copies for the time step. When the internal state copies are stored in a distributed representation data structure, the contents of the internal state copies can no longer be retrieved by the location of those copies as those contents are distributed in all of the locations of the distributed representation data structure. To retrieve an internal state copy, the associative LSTM layer needs to apply an extraction operation to the data in the distributed data structure. The associative LSTM layer uses the transformed output key for each internal state copy to obtain the value of that internal state copy from the distributed representation data structure.

Examples of a distributed representation data structure include a complex vector generated based on Holographic Reduced Representation (HRR).

In some implementations, the associative LSTM layer determines an output key from the layer input at the time step and the layer output for the preceding time step and determines the corresponding transformed output key for the copy by permuting the output key with a respective permutation matrix that is specific to the internal state copy.

In some implementations, the associative LSTM layer performs the following operation during each time step:

$$\hat{r}_o = W_{xh}x_t + W_{hh}h_{t-1} + b_h$$

where $\hat{r}_o$ is an initial output key of the respective time step, $x_t$ is the layer input for the time step, $h_{t-1}$ is the layer output for the preceding time step, $b_h$ is the bias vector for the time step, and $W_{xh}$ and $W_{hh}$ are parameter matrices applied to $x_t$ and $h_{t-1}$ respectively.

In some implementations, the associative LSTM layer applies a bound function on the initial key to generate the output key for the time step.

In some implementations, the bound function is a function that operates on a complex vector and restricts the modulus of each complex pair in the complex vector.

For instance, the bound function may entail the following operation on a complex vector h:

$$\text{bound}(h) = \begin{bmatrix} h_{real} \oslash d \\ h_{imaginary} \oslash d \end{bmatrix}$$

where $\oslash$ is an elementwise division operation with a vector d that causes an elementwise normalization by the modulus of each complex number in h. In some implementations, the associative LSTM layer may determine the value of the elements of d using the following equation:

$$\max(1, \sqrt{h_{real} \odot h_{real} + h_{imaginary} \odot h_{imaginary}})$$

where $\odot$ is an element-wise vector multiplication operation.

The associative LSTM layer updates each copy of the internal state (330). Updating copies of the internal states is described in greater detail below with reference to FIG. 3.

The associative LSTM layer modifies each updated copy of the internal state using the corresponding transformed output key (340).

In some implementations, the associative LSTM layer performs a binding operation, such as a complex vector multiplication operation, between an updated copy of the internal state and the transformed output key corresponding to the updated copy to modify the updated copy.

The associative LSTM layer combines the modified copies of the internal state (350).

In some implementations, the associative LSTM layer computes a measure of central tendency (e.g., an average) of the modified copies of the internal state to generate a combined internal state.

The associative LSTM layer determines the layer output from the combined internal state for the time step (360).

In some implementations, the associative LSTM layer maintains an output gate whose value at each time step is determined based on the layer input for the current time step and the layer output from a preceding the time step. For instance, the associative LSTM layer may determine the value of the output gate for each time step based on processing the layer input for the current time step and the layer output from a preceding the time step and applying an activation function (e.g., a logistic sigmoid function) to the result of that processing.

In some of those implementations, the associative LSTM layer applies an activation function (e.g., a hyperbolic tangent function) to the combined internal state to determine an initial layer output and applies the output gate to the initial layer output to determine the layer output for the time step.

In addition to the output gate, the associative LSTM layer may include: (1) a forget gate whose values determine whether the associative LSTM layer should process or ignore the output of the associative LSTM layer for a preceding time step as a hidden state and (2) an input gate whose values determine what the associative LSTM layer should adopt as the hidden state if it decides to ignore the output of the preceding time step.

For instance, the associative LSTM layer may perform the following operation:

$$h_t = g_o \odot \tan h(c_t)$$

where $h_t$ is the layer output for a time step, $g_o$ is the value of the output gate during the time step, $c_t$ is the combined internal state for the time step, and tan h is a hyperbolic tangent function.

Figure 4:
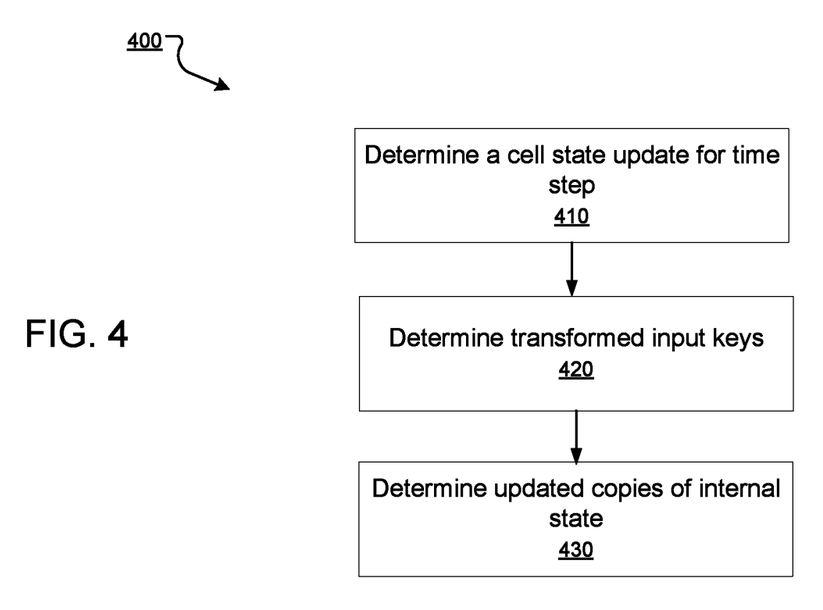
FIG. 4 is a flow chart of an example process for updating copies of an internal state for a particular time step.

FIG. 4 is a flow chart of an example process 400 for updating copies of an internal state for a particular time step. For convenience, the process 400 will be described as being performed by a system of one or more computers located in one or more locations. For example, an associative LSTM layer in a neural network system, e.g., the associative LSTM layer 120 of neural network system 100 of FIG. 1, appropriately programmed in accordance with this specification, can perform the process 400.

The associative LSTM layer determines a cell state update for the time step from the layer input at the time step and optionally the layer output for the preceding time step (410). The cell state update is a value that the associative LSTM layer calculates based on a measure of proposed update to the internal state for the time step. The associative LSTM layer may generate the proposed update to the internal state for the time step from the layer input for the time step and the layer output for a preceding time step.

In some implementations, the associative LSTM layer performs the following operations to generate the proposed update:

$$\hat{u} = W_{xu} x_t + W_{hu} h_{t-1} + b_u$$

where $\hat{u}$ is the proposed update to the internal state for a time step, $x_t$ is the layer input for the time step, $h_{t-1}$ is the layer output for a preceding time step, $b_u$ is the bias value for the time step used to generate the proposed update, and $W_{xu}$ and $W_{hu}$ are parameter values applied to $x_t$ and $h_{t-1}$ to generate the proposed update.

In some implementations, the associative LSTM layer applies the bound function to the proposed update to the internal state for a time step to generate the cell state update for the time step.

The associative LSTM layer determines a transformed input key for the time step from the layer input at the time step and optionally determines a corresponding transformed input key for each internal state copy from the layer input at the time step and the layer output for the preceding time step (420).

In some implementations, the associative LSTM layer uses an insertion operation to insert an internal state copy to a distributed representation data structure that includes the contents of the internal state copies for a time step (as explained above). The transformed input key may be an operand of that insertion operation.

In some of those implementations, the associative LSTM layer determines the transformed input key based on the input key by applying a permutation matrix for the specific internal state copy to the input key.

In some implementations, the associative LSTM layer uses the same copy-specific permutation matrix to generate both the transformed output key and the transformed input key for the specific internal state copy.

The copy-specific permutation matrix may be a random permutation matrix with following form:

$$\begin{bmatrix} P_s & 0 \\ 0 & P_s \end{bmatrix}$$

where $P_s$ is matrix with random values which is applied to both the real and the imaginary part of a complex input key vector and a complex output key vector.

In some implementations, the associative LSTM layer performs the following operation:

$$\hat{r}_i = W_{xh} x_t + W_{hh} h_{t-1} + b_h$$

where $\hat{r}_i$ is an initial input key of the respective time step, $x_t$ is the layer input for the time step, $h_{t-1}$ is the layer output for the preceding time step, $b_h$ is the bias value for the time step, and $W_{xh}$ and $W_{hh}$ are parameter values applied to $x_t$ and $h_{t-1}$ respectively.

In some implementations, the associative LSTM layer applies the bound function to the initial values for the input key of a time step to generate the input key for the time step.

The associative LSTM layer determines each updated copy of the internal state from the copy of the internal state, the cell state update, and the corresponding transformed input key (430).

In some implementations, the associative LSTM determines each updated copy of the internal state for a time step from the layer input for the time step and the values of multiple LSTM gates in the time step.

In some implementations, the associative LSTM layer applies the transformed input key for an internal state copy to the cell state update for the time step and combines the resulting value with a measure of the internal state copy to determine the updated internal state copy.

In some implementations, the associative LSTM layer performs the following operation:

$$c_{s,t} = g_f \odot c_{s,t-1} + r_{i,s} \circledast (g_i \odot u)$$

where $c_{s,t}$ is the updated copy of an internal state, $g_f$ is the forget gate of the associative LSTM layer for the time step, $r_{i,s}$ is the transformed input key for the internal state copy, $g_i$ is the input gate of the associative LSTM layer for a time step, u is the cell state update for the time step, $\circledast$ is a complex vector multiplication operation, and $\odot$ is an element-wise vector multiplication operation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
   a recurrent neural network implemented by one or more computers,
   wherein the recurrent neural network is configured to receive a respective neural network input at each of a plurality of time steps and to generate a respective neural network output at each of the plurality of time steps,
   wherein the recurrent neural network includes an associative long short-term memory (LSTM) layer,
   wherein the associative LSTM layer is configured to maintain, across each of the plurality of time steps, N copies of an internal state for the associative LSTM layer, N being an integer greater than one, wherein each copy of the internal state is different from each other copy, and
   wherein the associative LSTM layer is further configured to, at each of the plurality of time steps:
   receive a layer input for the time step; update each of the N copies of the internal state using the layer input for the time step and a layer output generated by the associative LSTM layer for a preceding time step; and
   generate a layer output for the time step using the N updated copies of the internal state, comprising:
      combining the N updated copies of the internal state to generate a combined internal state for the time step, comprising:
         modifying, for each of the N updated copies of the internal state, the updated copy to generate a modified copy of the internal state, and
         determining an average of the N modified copies of the internal state to generate the combined internal state for the time step; and
      determining the layer output from the combined internal state for the time step.

2. The system of claim 1, wherein updating each of the N copies of the internal state comprises:
   determining a cell state update for the time step from the layer input at the time step and optionally the layer output for the preceding time step;
   determining, for each of the N copies of the internal state, a corresponding transformed input key from the layer input at the time step and the layer output for the preceding time step; and
   for each of the N copies of the internal state, determining the updated copy of the internal state from the copy of the internal state, the cell state update, and the corresponding transformed input key.

3. The system of claim 2, wherein determining, for each of the N copies of the internal state, a corresponding transformed input key from the layer input at the time step and the layer output for the preceding time step comprises:
   determining an input key from the layer input at the time step and the layer output for the preceding time step; and
   for each of the N copies of the internal state, determining the corresponding transformed input key for the copy by permuting the input key with a respective permutation matrix that is specific to the copy.

4. The system of claim 2, wherein updating each of the N copies of the internal state further comprises:
   determining an input gate from the layer input at the time step and the layer output for the preceding time step, and
   determining a forget gate from the layer input at the time step and the layer output for the preceding time step.

5. The system of claim 4, wherein determining the updated copy of the internal state from the copy of the internal state, the cell state update, and the corresponding transformed input key comprises:
   applying the forget gate to the copy of the internal state to generate an initial updated copy;
   applying the input gate to the cell state update to generate a final cell state update;
   applying the corresponding transformed input key to the final cell state update to generate a rotated cell state update; and
   combining the initial updated copy and the rotated cell state update to generate the updated copy of the internal state.

6. The system of claim 1, wherein modifying the N updated copies of the internal state to generate modified copies of the internal state comprises:
   determining, for each of the N updated copies of the internal state, a corresponding transformed output key from the layer input at the time step and the layer output for the preceding time step; and
   modifying, for each of the N updated copies of the internal state, the updated copy of the internal state using the corresponding transformed output key.

7. The system of claim 6, wherein determining, for each of the N updated copies of the internal state, a corresponding transformed output key from the layer input at the time step and the layer output for the preceding time step comprises:
   determining an output key from the layer input at the time step and the layer output for the preceding time step; and
   for each of the N updated copies of the internal state, determining the corresponding transformed output key for the updated copy by permuting the output key with a respective permutation matrix that is specific to the copy.

8. The system of claim 6, wherein generating the layer output for the time step further comprises:
   determining an output gate from the layer input at the time step and the layer output for the preceding time step, and wherein determining the layer output from the combined internal state for the time step comprises:
   applying an activation function to the combined internal state to determine an initial layer output; and
   applying the output gate to the initial layer output to determine the layer output for the time step.

9. The system of claim 1, wherein maintaining, across each of the plurality of time steps, N copies of an internal state for the associative LSTM layer comprises maintaining the N copies of the internal state using a Holographic Reduced Representation.

10. A method comprising:
    receiving, by an associative long short-term memory (LSTM) layer of a recurrent neural network, a layer input for each of a plurality of time steps, wherein:
       the recurrent neural network is configured to receive a respective neural network input at each of the plurality of time steps and to generate a respective neural network output at each of the plurality of time steps, and
       the associative LSTM layer is configured to maintain, across each of the plurality of time steps, N copies of an internal state for the associative LSTM layer, N being an integer greater than one, wherein each copy of the internal state is different from each other copy;
    updating, by the associative LSTM layer, each of the N copies of the internal state using the layer input for the time step and a layer output generated by the associative LSTM layer for a preceding time step; and
    generating, bythe associative LSTM layer, a layer output for the time step using the N updated copies of the internal state, comprising:
       combining the N updated copies of the internal state to generate a combined internal state for the time step, comprising:
          modifying, for each of the N updated copies of the internal state, the updated copy to generate a modified copy of the internal state, and
          determining an average of the N modified copies of the internal state to generate the combined internal state for the time step; and
       determining the layer output from the combined internal state for the time step.

11. The method of claim 10, wherein updating each of the N copies of the internal state comprises:
    determining a cell state update for the time step from the layer input at the time step and optionally the layer output for the preceding time step;
    determining, for each of the N copies of the internal state, a corresponding transformed input key from the layer input at the time step and the layer output for the preceding time step; and
    for each of the N copies of the internal state, determining the updated copy of the internal state from the copy of the internal state, the cell state update, and the corresponding transformed input key.

12. The method of claim 11, wherein determining, for each of the N copies of the internal state, a corresponding transformed input key from the layer input at the time step and the layer output for the preceding time step comprises:
    determining an input key from the layer input at the time step and the layer output for the preceding time step; and
    for each of the N copies of the internal state, determining the corresponding transformed input key for the copy by permuting the input key with a respective permutation matrix that is specific to the copy.

13. The method of claim 11, wherein updating each of the N copies of the internal state further comprises:
    determining an input gate from the layer input at the time step and the layer output for the preceding time step, and determining a forget gate from the layer input at the time step and the layer output for the preceding time step.

14. The method of claim 13, determining the updated copy of the internal state from the copy of the internal state, the cell state update, and the corresponding transformed input key comprises:
applying the forget gate to the copy of the internal state to generate an initial updated copy;
applying the input gate to the cell state update to generate a final cell state update;
applying the corresponding transformed input key to the final cell state update to generate a rotated cell state update; and
combining the initial updated copy and the rotated cell state update to generate the updated copy of the internal state.

15. The method of claim 10, wherein modifying the N updated copies of the internal state to modified copies of the internal state comprises:
determining, for each of the N updated copies of the internal state, a corresponding transformed output key from the layer input at the time step and the layer output for the preceding time step; and
modifying, for each of the N updated copies of the internal state, the updated copy of the internal state using the corresponding transformed output key.

16. The method of claim 15, wherein determining, for each of the N updated copies of the internal state, a corresponding transformed output key from the layer input at the time step and the layer output for the preceding time step comprises:
determining an output key from the layer input at the time step and the layer output for the preceding time step; and
for each of the N updated copies of the internal state, determining the corresponding transformed output key for the updated copy by permuting the output key with a respective permutation matrix that is specific to the copy.

17. The method of claim 15, wherein generating the layer output for the time step further comprises:
determining an output gate from the layer input at the time step and the layer output for the preceding time step, and wherein determining the layer output from the combined internal state for the time step comprises:
applying an activation function to the combined internal state to determine an initial layer output; and
applying the output gate to the initial layer output to determine the layer output for the time step.

18. The method of claim 10, wherein maintaining, across each of the plurality of time steps, N copies of an internal state for the associated LSTM layer comprises maintaining N copies of the internal state using a Holographic Reduced Representation.

19. A non-transitory computer storage medium encoded with instructions that, when executed by one or more computers, cause the one or more computers to perform operations comprising:
receiving, by an associative long short-term memory (LSTM) layer of a recurrent neural network, a layer input for each of a plurality of time steps, wherein:
the recurrent neural network is configured to receive a respective neural network input at each of the plurality of time steps and to generate a respective neural network output at each of the plurality of time steps, and
the associative LSTM layer is configured to maintain, across each of the plurality of time steps, N copies of an internal state for the associative LSTM layer, N being an integer greater than one, wherein each copy of the internal state is different from each other copy;
updating, by the associative LSTM layer, each of the N copies of the internal state using the layer input for the time step and a layer output generated by the associative LSTM layer for a preceding time step; and
generating, bythe associative LSTM layer, a layer output for the time step using the N updated copies of the internal state, comprising:
combining the N updated copies of the internal state to generate a combined internal state for the time step, comprising:
modifying, for each of the N updated copies of the internal state, the updated copy to generate a modified copy of the internal state, and
determining an average of the N modified copies of the internal state to generate the combined internal state for the time step; and
determining the layer output from the combined internal state for the time step.

20. The non-transitory computer storage medium of claim 19, wherein updating each of the N copies of the internal state comprises: determining a cell state update for the time step from the layer input at the time step and optionally the layer output for the preceding time step; determining, for each of the N copies of the internal state, a corresponding transformed input key from the layer input at the time step and the layer output for the preceding time step; and for each of the N copies of the internal state, determining the updated copy of the internal state from the copy of the internal state, the cell state update, and the corresponding transformed input key.

* * * * *